United States Patent [19]
Kinoshita et al.

[11] Patent Number: 5,278,914
[45] Date of Patent: Jan. 11, 1994

[54] DETECTOR SYSTEMS FOR EXISTENCE OR NON-EXISTENCE AND STAGNATION OF REFUSE AND SYSTEM FOR PREVENTING STAGNATION OF REFUSE

[75] Inventors: Etsuko Kinoshita; Mitsuaki Tamagawa; Kazumasa Miyamoto, all of Kobe; Hisataka Yonezawa, Yokohama; Yoshitaka Ikeda, Nagoya, all of Japan

[73] Assignee: Mitsubishi Jukogyo Kabushiki Kaisha, Tokyo, Japan

[21] Appl. No.: 738,905

[22] Filed: Aug. 1, 1991

[30] Foreign Application Priority Data

Aug. 6, 1990 [JP] Japan ............................ 2-206895
Sep. 28, 1990 [JP] Japan ............................ 2-257052
Dec. 28, 1990 [JP] Japan ............................ 2-408704

[51] Int. Cl.$^5$ .............................................. H04N 7/18
[52] U.S. Cl. ................................... 382/1; 382/8; 358/105
[58] Field of Search ................ 358/105, 101, 108; 382/1, 8; 364/478, 516, 550; 209/930, 587

[56] References Cited

U.S. PATENT DOCUMENTS 3,613,558  10/1971  Math ........................... 100/49
5,034,986  7/1991   Karmann et al. ............ 382/41
5,134,472  7/1992   Abe .............................. 358/105

Primary Examiner—Michael T. Razavi
Assistant Examiner—Jon C. Chang
Attorney, Agent, or Firm—Wenderoth, Lind & Ponack

[57] ABSTRACT

In order to efficiently controlling a compressing feeder of refuse, a novel detector system for existence or non-existence of refuse, a novel detector system for stagnation of refuse, and a novel system for preventing stagnation of refuse, are disclosed. The refuse existence detector system comprises an image pick-up device, an A/D converter for an analog image signal, a background image memory, a luminance variation detector, a background image selector, a subtractor for subtracting a background image signal from a digitized image signal, a binary encoder for issuing binary-coded image difference signal, an area calculator for calculating an area of an image region where the binary-coded image difference signal is binary "1", and a determinator device for determining whether existence or non-existence of refuse on the basis of the output of the area calculator. The refuse stagnation detector system and the refuse stagnation preventing system are constructed on the basis of a similar inventive concept.

3 Claims, 8 Drawing Sheets

REFUSE NONEXISTENT STATE (BACKGROUND)

REFUSE EXISTENT STATE

THRESHOLD VALUE $\Delta b0$ FOR BINARY-ENCODING STEAM, DUST PRESENT

AFTER BINARY-ENCODING

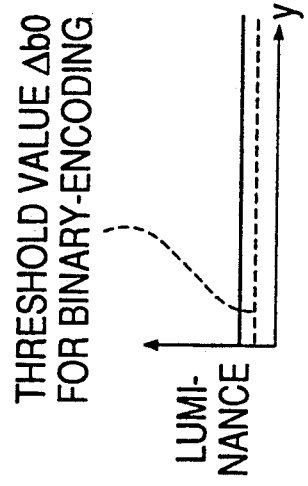 FIG. 4(a) THE CASE WHERE SELECTED BACKGROUND IS IMPROPER

FIG. 4(d) AFTER BINARY-CODING

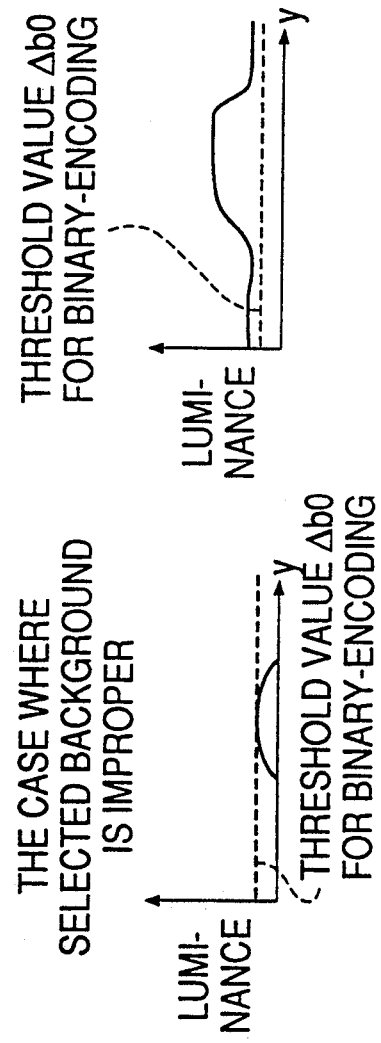

DETECTOR SYSTEMS FOR EXISTENCE OR NON-EXISTENCE AND STAGNATION OF REFUSE AND SYSTEM FOR PREVENTING STAGNATION OF REFUSE

BACKGROUND OF THE INVENTION

1. Field of the Invention

The present invention relates to a detector system for existence or non-existence and stagnation of refuse and a system for preventing stagnation of refuse, which are applicable to control of a feed conveyor and a compressing feeder in a refuse shredder.

2. Description of the Prior Art

A general construction of a refuse shredder in the prior art is shown in FIG. 10.

Refuse is dropped from a feed conveyor 01 onto a chute 02, then a roller of a compressing feeder 03 bites and compresses the charged refuse, and also it feed the refuse to a press cutter section 05. The refuse is sheared by rotating hammers 04.

A push-in device 06 in the chute is an actuator for pushing an article hardly bitten by the roller (for instance, a large-sized box-shaped article) to the roller. A hydraulic cylinder 07 is a member for adjusting a gap between the chute 02 and the roller of the compressing feeder 03, and while the roller is normally rigidly supported, the hydraulic cylinder is used when the gap is broadened. Reference numeral 09 designates a grate of the refuse shredder.

A television camera is installed so that a charging state and a stagnating state of refuse in the compressing feeder 03 can be grasped, and while an operator is continuously monitoring the image, operations of the feed conveyor 01 and the compressing feeder 03 of the refuse shredder were carried out.

However, in the operations of the above-described refuse shredder in the prior art, since control of the refuse shredder was effected after the state of the refuse charged from a refuse feed conveyor into a feeder section had been judged by a person while an operator was continuously watching a television monitor, adequate judgement could not be done due to individual differences, sometimes troubles would arise in operations of the refuse shredder, and also since it was necessary to continuously monitor, it was resulted that workers were forced to perform excessively hard work. In addition, for making determination with respect to existence or non-existence and stagnation of refuse, the following knowledge and experience were necessary.

(1) An optical reflection state is different between the state where refuse exists and the state where refuse does not exist. More particularly. in the case where refuse exists, a luminance level would rise as compared to the case where refuse does not exist at the same place.

(2) Since the state of the compressing feeder section is varying moment by moment and a general luminance level varies, whether existence or non-existence of refuse or stagnation of refuse is judged by taking into consideration the level variation.

SUMMARY OF THE INVENTION

It is therefore one object of the present invention to provide improved detector systems for existence or non-existence and stagnation of refuse and an improved system for preventing stagnation of refuse, which are free from the above-mentioned shortcomings of such systems in the prior art.

A more specific object of the present invention is to provide such systems in which an operating burden of an operator is mitigated and which can be applied to automation of refuse level control in a refuse feeder.

According to one feature of the present invention, there is provided a detector system for whether existence or non-existence of refuse, comprising an image pick-up device for picking up an image of refuse in a compressing feeder to get a video signal, an A/D converter for digitizing an analog video signal output from the image pick-up device, a background image memory to which a plurality of images of the compressing feeder have been preliminarily input, a luminance variation detector responsive to outputs of the A/D converter and the background image memory for detecting variation of the picked up image, a background image selector responsive to outputs of the luminance variation detector and the background image memory for outputting one of the plurality of images depending upon the luminance variation, a subtractor responsive to outputs of the A/D converter and the background image selector for outputting a difference between the above-mentioned outputs, a binary encoder responsive to an output of the subtractor for issuing a binary-coded output, an area calculator responsive to the output of the binary encoder for calculating an area, and a determinator device responsive to an output of the area calculator for determining whether existence or non-existence of refuse.

According to another feature of the present invention, there is provided a detector system for stagnation of refuse, comprising an image pick-up device for converting an image of the external world into a video signal, an A/D converter for digitizing an analog signal output from the image pick-up device, an adder-memory for adding and storing the digital image output from the A/D converter starting from the time point when refuse has been charged, an averaging device for taking out a digital image from the adder-memory and averaging it, one and the other background image memories in which a background image not containing a subject to be recognized is stored, one and the other subtractors for subtracting background images taken out from the aforementioned one and the other background image memories respectively from a digital image output from the A/D converter or the averaging device, one and the other binary encoder for binary-coding the outputs of the aforementioned one and the other subtractors respectively with respect to respective thresholds, one and the other area calculators for respectively calculating areas of the binary images output from the aforementioned one and the other binary encoders, a determination flag for storing a last determined state, one determinator device for determining whether or not refuse has been charged on the basis of an area output from the aforementioned area calculator, a value of the above-mentioned determination flag and a threshold, and the other determinator device for determining whether or not refuse is stagnating on the basis of an area of an added and averaged image output from the aforementioned area calculator and a threshold.

According to still another feature of the present invention, there is provided a system for preventing stagnation of refuse, comprising a stagnation detector system for automatically detecting stagnation of refuse, a number of times of stagnation determination flag having a detection signal input thereto from the aforementioned stagnation detector and storing a number of times of consecutive detection of stagnation of refuse by the aforementioned stagnation detector, and a control device having the number of times signal input thereto from the aforementioned determination flag for controlling a push-in device and an alarm device and outputting a detection recommencing signal to the above-mentioned stagnation detector system.

According to the present invention as featured above, an image of refuse in the compressing feeder section is picked up by the image pick-up device, and then the image signal is digitized by the A/D converter. Also, the luminance variation detector responds to outputs of the A/D converter and the background image memory to detect and output a general luminance variation of the picked up image on the basis of the background image of the compressing feeder. Furthermore, the background image selector responds to outputs of the luminance variation detector and the background image memory to select and output one of the plurality of background images of the compressing feeder depending upon the above-mentioned luminance variation. The subtractor responds to outputs of the A/D converter and the background image selector to output a difference between the outputs to a binary encoder, where the difference signal is binary-coded and output. Further, the area calculator responds to an output of the binary encoder to calculate and area of the binary-coded image. The determinator device responds to an output of the area calculator to output a refuse existence signal when the calculated area is equal to or larger than a predetermined value and to output a refuse non-existence signal when the calculated area does not exceed the predetermined value.

Since an image of refuse in a compressing feeder is detected as compared with a background image corresponding to the state when the image was picked up in the above-described manner, automatic determination at a high reliability can be attained. Accordingly, an operation burden of an operator can be greatly mitigated. Also, the system can serve as a detector system upon introduction of automatic operation.

According to the second feature of the present invention, an image of the feeder section is picked up by means of the image pick-up device which converts an image of the external world into a video signal, and by converting the output analog signal by means of the A/D converter, a digital image which can be subjected to computer processing is attained.

By subtracting a background image stored in one background image memory from a digital image output from the above-mentioned A/D converter, an image portion other than refuse is eliminated, then a binary image for which counting of an area is possible is obtained by means of one binary encoder, an area occupied by refuse is calculated by means of one area calculator, and it is determined by the determinator device whether refuse has been charged or not.

An output image of the A/D converter after the time point when charging of refuse was determined is added and stored by means of the adder-memory, and it is averaged by means of the averaging device. After an image portion other than refuse has been eliminated by subtracting a background image stored in the other background image memory from the averaged image, on the basis of the area occupied by refuse which was obtained through the other binary encoder and the other area calculator, determination is made whether refuse is stagnating or not.

Through the above-mentioned process, automatic determination of whether refuse has been charged or not becomes possible, automation of determination of whether refuse is stagnating or not becomes possible, hence an operating burden of an operator is mitigated, and it also becomes possible to apply the system to automation of refuse level control within a feeder.

According to the third feature of the present invention, after a refuse shredder commenced to operate, if the stagnation detector system detects stagnation of refuse, then detection of stagnation of refuse is interrupted, the detection signal is output to the number of times of stagnation determination flag, and the same determination flag stores a number of times of 1 and outputs a number of times signal to the control device.

When the above-mentioned control device has the number of times signal input thereto, it drives the push-in device for a predetermined period of time, and when the predetermined period has elapsed, it stops the push-in device and outputs a detection recommencing signal to the above-mentioned stagnation detector system, and the stagnation detector system recommences detection of stagnation of refuse.

In the above-mentioned stagnation detector system, in the case where refuse is stagnating at the time point of recommencement of detection of stagnation of refuse, the number of times of stagnation determination flag adds and stores a number of times of 1, and the control device controls the push-in device, while in the case where refuse is not stagnating, the number of times of stagnation determination flag changes the number of times stored by the number of times of stagnation determination flag to 0, and detection of stagnation of refuse is sustained.

In the case where the number of times signal input from the aforementioned number of times of stagnation detection flag to the control device has a value equal to or larger than a predetermined value, the above-mentioned control device actuates the alarm device in addition to the push-in device, and it alarms a stagnated state to an operator.

Through the above-described process, detection of stagnation in the refuse shredder and operations of the push-in device in response to the stagnation are automated, and mitigation of an operating burden of an operator is made possible.

The above-mentioned and other objects, features and advantages of the present invention will become more apparent by reference to the following description of preferred embodiments of the invention taken in conjunction with the accompanying drawings

DESCRIPTION OF THE PREFERRED EMBODIMENTS:

Now a first preferred embodiment of the present invention will be described with reference to FIGS. 1 to 4.

Figure 1:
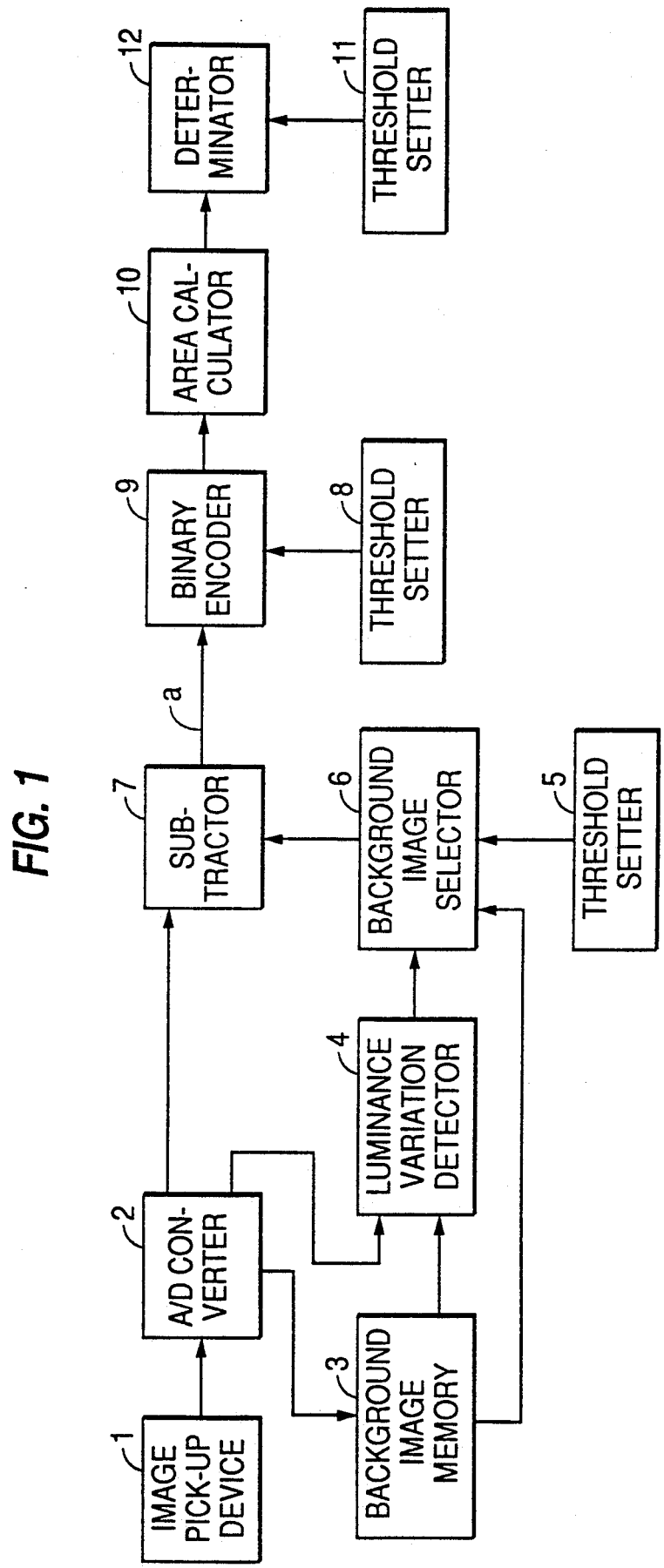
FIG. 1 is a block diagram showing a construction of a first preferred embodiment of the present invention.

A general construction of the first preferred embodiment is shown in block form in FIG. 1, and diagrams showing variations of luminance along one sweep line of images are depicted in FIGS. 2 to 4. In FIG. 1, an output of an image pick-up device 1 is sent via an A/D converter 2 sequentially to a subtractor 7, a binary-encoder 9, an area calculator 10 and a determinator device 12. An output of the A/D converter 2 is also sent to a background image memory 3 and to a luminance variation detector 4. Furthermore, an output of the background image memory 3 is sent to the luminance variation detector 4 and to a background image selector 6. Still further, an output of the luminance variation detector 4 is sent to the background image selector 6. In addition, outputs of respective threshold setters 5, 8 and 11 are respectively sent to the background image selector 5, the binary-encoder 9 and the determinator device 12.

In the above-described construction, refuse in the compressing feeder 03 is picked up by means of the image pick-up device 1. Images of the compressing feeder 03 to which refuse has not been charged, under the condition where neither steam nor dust is present, and under the condition where steam and/or dust envelops (under the conditions having different overall luminance levels), were preliminarily picked up by the image pick-up device 1 always containing the portion where refuse was not present, and have been stored in the background image memory 3. As the stored digital signal image data, luminance at the respective coordinate (x, y) points is represented by the form of $B_1(x, y)$ under the condition where neither steam nor dust is present, or by the form of $B_2(x, y)$ under the condition where steam and/or dust envelope, assuming $1 \leq x \leq m$ and $1 \leq y \leq n$ (See FIGS. 2(a) and 2(b)). Hereinafter, image data are represented by the form of $B_1(x, y)$ or the like.

Figure 2A:
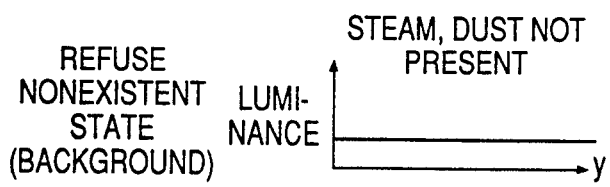
FIGS. 2 to 4 are diagrams for explaining operations of the first preferred embodiment.
Figure 2B:
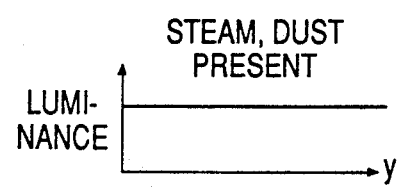
Figure 2C:
Figure 2D:
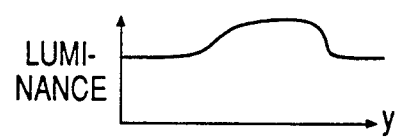

Digital signal image data picked up by the image pick-up device are represented by F (x, y) (See FIGS. 2(c) and 2(d)).

The luminance variation detector 4 responds to an output of the A/D converter 2, and it detects and outputs variation of luminance of an entire image through the following calculation.

Within the image of the compressing feeder 03, coordinates of a portion where refuse is normally not present are designated in multiple, and the coordinates are assumed to be $(x_k, y_1)$. An average $\Delta b$ of a difference between the image data $F(x_k, y_1)$ and background image data $B_1(x_k, y_1)$ in the case of absence of steam nor dust which are taken out from the background image memory 3, is calculated and output through calculation of the following Equation-(1):

$$\Delta b = 1/a \sum_k \sum_l \{F(x_k, y_l) - B_1(x_k, y_l)\} \quad (1)$$

(a is a total number of image elements in the portion where refuse is normally not present)

In addition, the background image selector 6 responds to outputs of the luminance detector 4, the background image memory 3 and the threshold setter 5, and it selects and outputs a background image through the following operation:

if $\Delta b < \Delta b_0$, the background image $B_1(x, y)$ is output, but (2)

if $\Delta b \geq \Delta b_0$, the background image $B_2(x, y)$ is output.

where $\Delta b_0$ is an output of the preset threshold setter 5.

The subtractor 7 responds to outputs of the A/D converter 2 and the background image selector 6, and it outputs a differential image E (x, y) through calculation represented by the following Equation-(3).

Figure 3A:
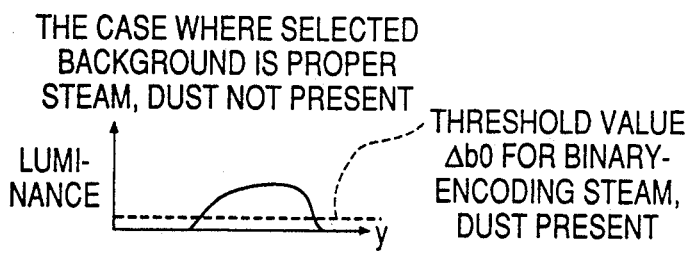
Figure 3B:
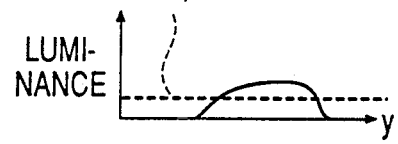
Figure 3C:
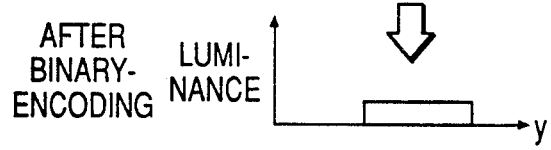
Figure 3D:
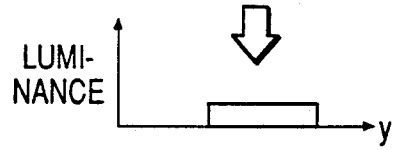
Figure 4B:
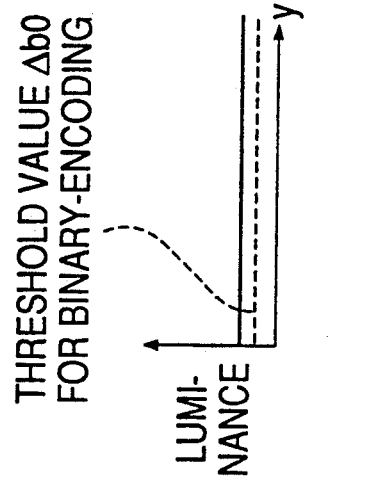
Figure 4C:
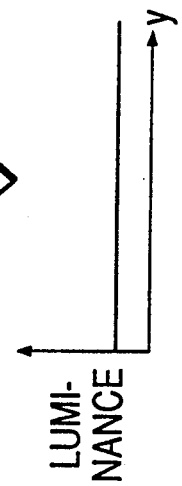
Figure 4E:
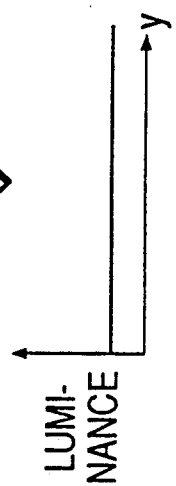
Figure 4F:
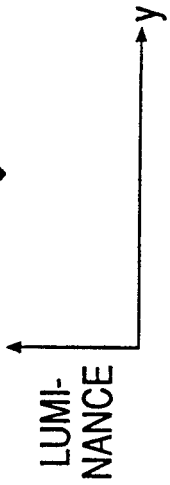

The relationships among these outputs are shown in FIGS. 3(a) and 3(b) and in FIGS. 4(a), 4(b) and 4(c). FIG. 3(a) shows the relationship in the case where neither steam nor dust is present, which is formed by subtracting the luminance in FIG. 2(a) from the luminance in FIG. 2(c), and FIG. 3(b) shows the relationship in the case where steam and/or dust is present, which is formed by subtracting the luminance in FIG. 2(b) from the luminance in FIG. 2(d). In addition, FIGS. 4(a), 4(b) and 4(c) are diagrams intentionally prepared for the purpose of clarifying properness of the above-described operations, FIG. 4(a) is a diagram formed by subtracting the luminance in FIG. 2(b) from the luminance in FIG. 2(c), FIG. 4(b) is a diagram formed by subtracting the luminance in FIG. 2(a) from the luminance in FIG. 2(d), and FIG. 4(c) is a diagram formed by subtracting the luminance in FIG. 2(a) from the luminance in FIG. 2(b).

$$E(x,y) = F(x,y) - B_i(x,y) \quad (3)$$

Furthermore, the binary-encoder 9 responds to outputs of the subtractor 7 and the threshold setter 8, and it performs following operations and outputs (See FIGS. 3(c) and 3(d) and FIGS. 4(d), 4(e) and 4(f)).

if $E(x,y) < h$, "0" is output. $(N(x,y) = 0)$
if $E(x,y) \geq h$, "1" is output. $(N(x,y) = 1)$ (4)

where h is an output of the preset threshold setter 8.

In addition, the area calculator 10 responds to an output of the binary-encoder 9, and it outputs a count value of the number of coordinates (x, y) where luminance of the binary image data N (x, y) output from the binary-encoder 9 is "1", as an area S of refuse.

Furthermore, the determinator device 12 responds to outputs of the area calculator 10 and the threshold setter 11, and it performs the following operation to determine whether existence or non-existence of refuse and output it:

if $S < S_0$, "non-existence of refuse" is output, but if $S \geq S_0$, "existence of refuse" is output. $\quad(5)$ where $S_0$ is an output of the preset threshold setter.

In the above-described manner, automatic determination of whether existence or non-existence of refuse can be achieved while recognizing variation of the state such as presence of steam or dust in the compressing feeder 03, and an operating burden of an operator can be greatly mitigated.

Figure 5:
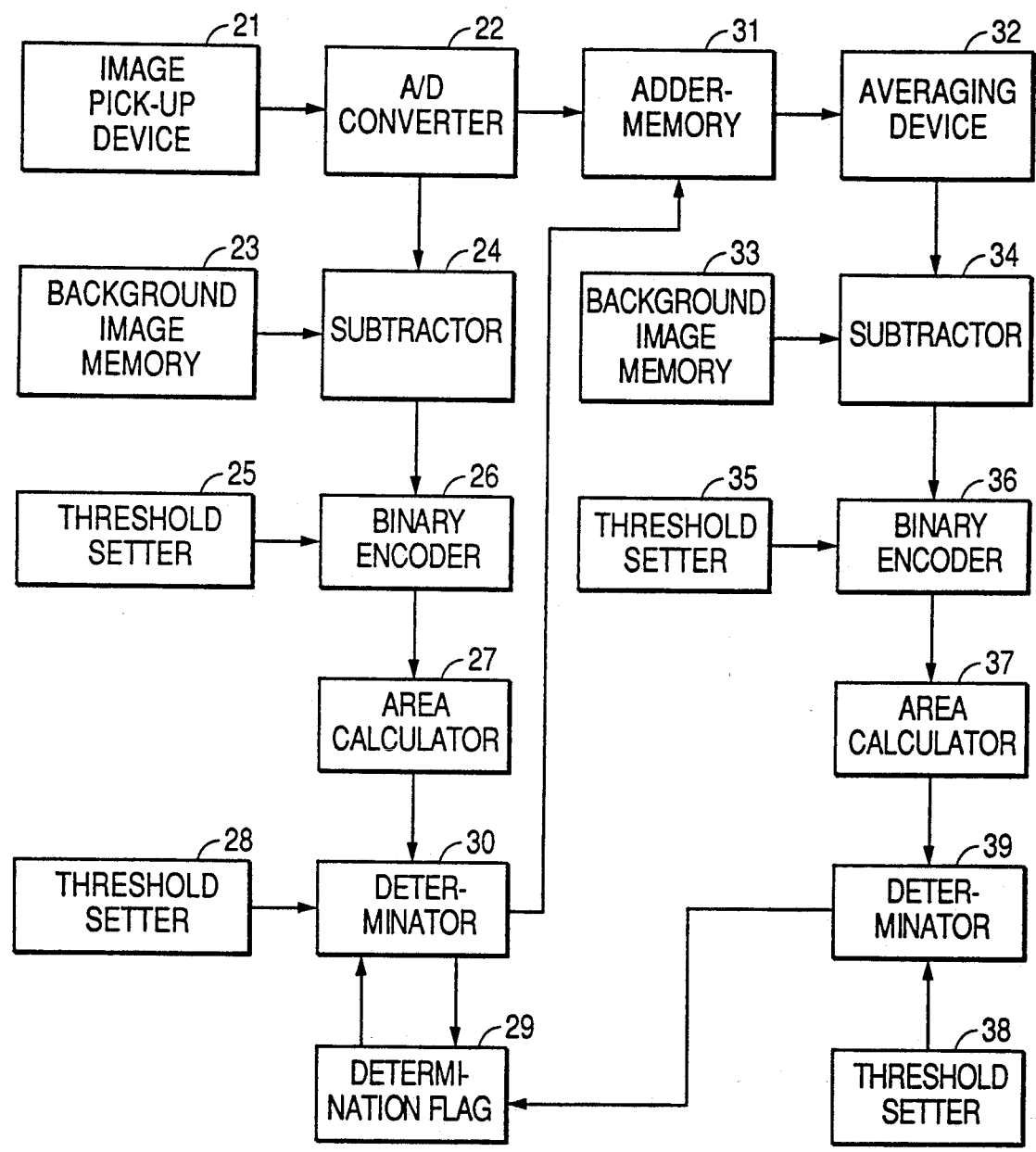
FIG. 5 is a block diagram showing an entire construction of a second preferred embodiment of the present invention.

Next, a second preferred embodiment of the present invention will be described with reference to FIG. 5. This preferred embodiment comprises an image pick-up device 21 for converting an image of the external world into a video signal, an A/D converter 22 for digitizing an analog signal output from the above-mentioned image pick-up device 21, an adder-memory 31 for adding and storing the digital image output from the aforementioned A/D converter starting from the time point when refuse has been charged, an averaging device 32 for taking out a digital image from the above-mentioned adder-memory 31, background image memories 23 and 33 in which a background image not containing a subject to be recognized is stored, subtractors 24 and 34 for subtracting background images from the aforementioned background image memories 23 and 33 respectively from a digital image output from the above-mentioned A/D converter 22 or the averaging device 32, binary-encoders 26 and 36 for binary-coding the outputs of the aforementioned subtractors 24 and 34 respectively with respect to respective thresholds 25 and 35, area calculators 27 and 37 for respectively calculating areas of the binary images output from the aforementioned binary-encoders 26 and 36, a determination flag 29 for storing a last determined state, a determinator device 30 for determining whether or not refuse has been charged on the basis of an area output from the aforementioned area calculator 27, a value of the aforementioned determination flag 29 and a threshold 28, and another determinator device for determining whether or not refuse is stagnating on the basis of an area of an added and averaged image output from the aforementioned area calculator 37 and a threshold 38.

In the above-described second preferred embodiment, an image of the compressing feeder is picked up from the above of the feed conveyor by means of the image pick-up device 21 at a predetermined sampling interval, and whether or not refuse has been charged to the compressing feeder is determined through the following process.

An analog signal output from the image pick-up device 21 is digitized by the A/D converter. Assuming that image data obtained at the present time point $T_0$ are given for the coordinate range of $1 \leq x \leq m$, $1 \leq y \leq n$, and luminance at the respective coordinate points (x, y) is represented by the form of F (x, y). Hereinafter, image data are represented in the form of F (x, y).

Next, in order to make clear the portion other than refuse, a differential image E (x, y) is sought for by making use of the digital image data F (x, y) and the background image data B (x, y) preset in the background image memory 23, through the calculation of Equation-(6) in the subtractor 24.

$$E(x,y) = F(x,y) - B(x,y) \quad (6)$$

where $1 \leq x \leq m$, $1 \leq y \leq n$

With regard to the differential image E (x, y), for the respective coordinates (x, y) of E (x, y), the following binary-encoding processing is effected in the binary-encoder 26 by making use of a threshold value h which is separately preset in the threshold setter 25.

if E (x, y) < h, "0" is output (N (x,y)=0), but
if E (x, y) ≥ h, "1" is output (N (x,y)=1)

With regard to the binary image data N (x, y) output from the binary encoder 26, a number of coordinates (x, y) where luminance is 1 is counted by the area calculator 27, and the count value is used as an area $S_N$ ($T_0$) occupied by refuse in the image data.

In the determinator 30, a threshold value $S_1$ separately preset in the threshold setter 28 and the area $S_N$ ($T_0$) are compared with each other, and the following determination is effected by making use of a value Q ($T_0 - \Delta T$) (initial value Q (0)=0) of the determination flag 29 at a time of one sampling period before:

if Q ($T_0-\Delta T$)=0 and $S_N$ ($T_0$)$\geq S_1$, it is determined that refuse has been charged, and Q ($T_0$)=1 is output, but if Q ($T_0-\Delta T$)=0 and $S_N$ ($T_0$)<$S_1$, it is determined that refuse is little, and Q ($T_0$)=0 is output.

As described above, according to the time interval $\Delta T$ for sampling an image, whether or not refuse has been charged is successively determined every $\Delta T$.

At the time point when it is determined that refuse has been charged and the output has changed to Q ($T_0$)=1, the determination of whether or not refuse has been charged is interrupted, and the memory content in the adder-memory 31 is cleared to zero. Thereby, the system is ready to trace only a new state of refuse.

Next, addition of $I_0$ sets of image data (during a period of $I_0\Delta T$) starting from a digital image F (x, y, $T_1+\Delta T$) at the output of the A/D converter 22 to data A (x, y, T) in the adder-memory 31 is commenced through the process of Equation-(7). However, during this period, determination of whether or not refuse has been charged is not effected.

$$A(x,y,T_1+(I+1)\Delta T) = A(x,y,T_1+I\Delta T) + F(x,y,T_1+I\Delta T) \quad (7)$$

where $1 \leq I \leq I_0$.

A digital image A (x,y, $T_1+I_0\Delta T$) is taken out from the adder-memory 31, the calculation of Equation-(8) is carried out in the averaging device 32, and an averaged image R (x, y, $T_1+I_0\Delta T$) is sought for.

$$R(x,y,T_1+I_0\Delta T) = A(x,y,T_1+I_0\Delta T)/I_0 \quad (8)$$

For the output R (x, y, $T_1+I_0\Delta T$), the same processing as that carried out previously for the data F (x, y) is carried out by the subtractor 34, the binary-encoder 36 and the area calculator 37 succeeding to the averaging device 32. Among the obtained image data, if the area occupied by refuse is represented by SR ($T_1+I_0\Delta T$), by comparing with a threshold value $S_2$ given by a threshold setter 38, the following determination of stagnation is effected in a determinator device 39. The determination flag 29 determines, during the interrupted condition of Q ($T_1$)=0, if $S_R$ ($T_1+I_0\Delta T$)$\geq S_2$, that refuse is stagnating, but
if $S_R$ ($T_1+I_0\Delta T$)<$S_2$, that refuse is not stagnating, and outputs Q ($T_1+I_0\Delta T$)=0 (See FIG. 7).

In the case where determination has been made that refuse is not stagnating, determination of whether or not refuse has been charged is again commenced from the time point of $T_1 + I_0 \Delta T + \Delta T$.

Figure 6:
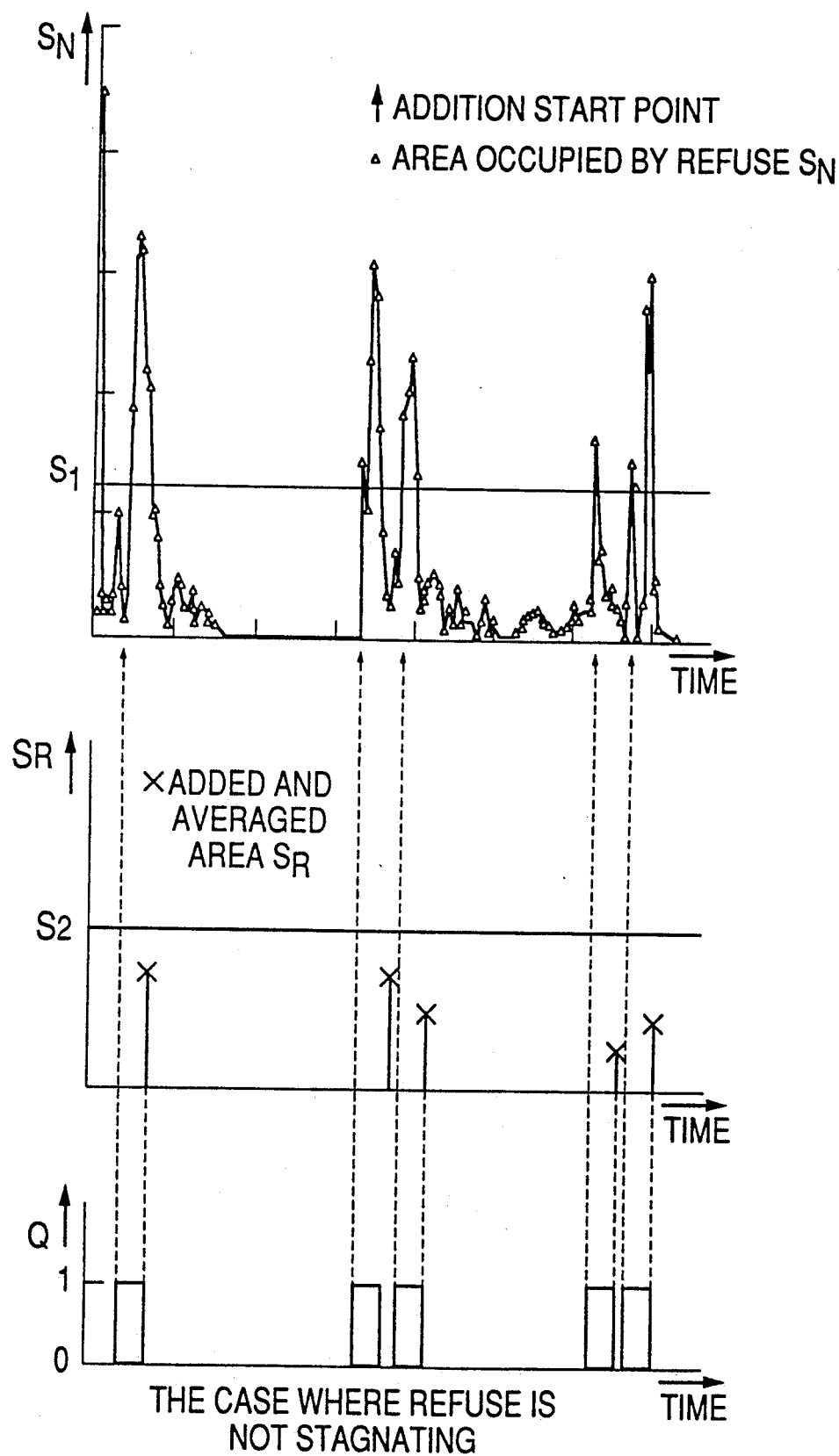
FIG. 6 is a diagram for explaining operations of the second preferred embodiment under a condition where refuse is not stagnating.
Figure 7:
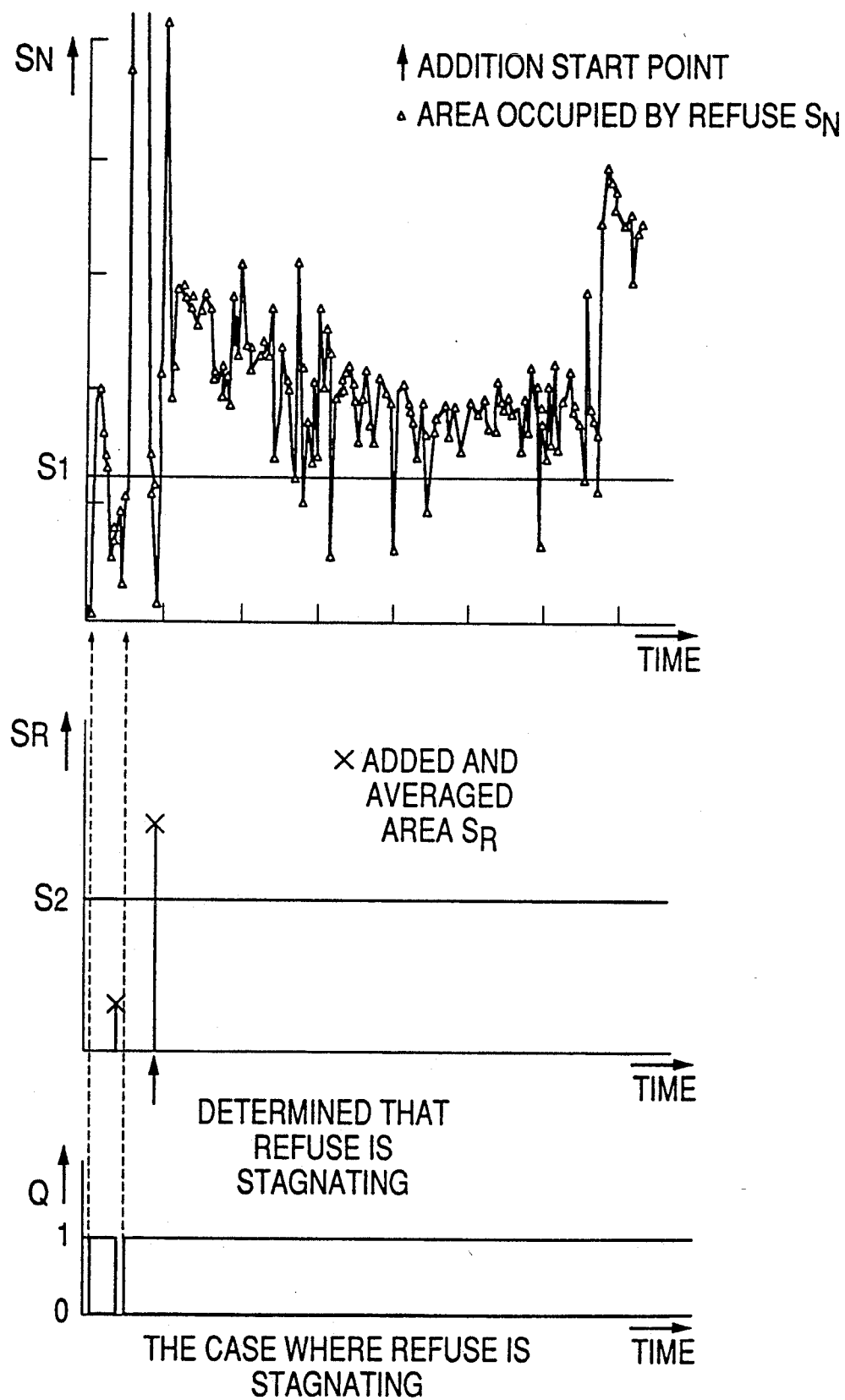
FIG. 7 is a diagram for explaining operations of the same preferred embodiment under a condition where refuse is stagnating.

FIGS. 6 and 7 are diagrams showing the effects of this preferred embodiment, in which variation with time of the area $S_N(T)$ occupied by refuse in the image data output from the area calculator 27, variation with time of the area $S_R(T)$ always occupied by refuse in the image data averaged after summed up for a predetermined period output from the area calculator 37, and variation with time of the output Q (T) of the determination flag 29 are shown along the same time axis.

In the determination flag 29, Q (T) is set as "1" at the time point when the area $S_N(T)$ has become equal to or larger than the threshold value $S_1$ of the threshold setter 28, and if the area $S_R(T)$ is smaller than the threshold value $S_2$ of the threshold setter 38, it is reset to "0".

As described above, according to the time interval $\Delta T$ for sampling an image, determination of whether or not refuse has been charged is effected sequentially at an interval of $\Delta T$, and simultaneously determination of whether or not refuse is stagnating after refuse has been charged, is effected.

Through the above-mentioned process, automatic determination of whether or not refuse has been charged becomes possible, automatic determination of whether or not refuse is stagnating also becomes possible, thereby an operating burden of an operator can be mitigated, and application of this system to automation of level control for refuse within a feeder also becomes possible.

Figure 8:
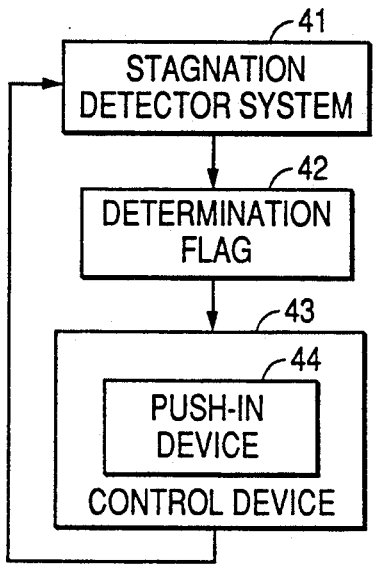
FIG. 8 is a block diagram showing an entire construction of a third preferred embodiment of the present invention.

A third preferred embodiment of the present invention is shown in FIG. 8.

The preferred embodiment shown in FIG. 8 comprises a stagnation detector system 41 for automatically detecting stagnation of refuse in a feeder section or the like, a number of times of stagnation determination flag 42 having a detection signal input thereto from the same detector system 41 and storing a number of times of consecutive detection of stagnation of refuse by the aforementioned stagnation detector system 41, and a control device 43 having the number of times signal input thereto from the same determination flag 42 for controlling a push-in device 44 and an alarm device not shown and outputting detection recommencing signal to the aforementioned stagnation detector system 41.

In the above-described embodiment, control for a refuse shredder according to a stagnating state of refuse is carried out sequentially through the following process.

At first, it is assumed that an initial value of the value F (T) of the number of times of stagnation determination flag 42 is zero (F ($T_0$)=0). Assuming that the time point when the stagnation detector system 41 has detected stagnation of refuse is $T_1$, detection of stagnation is interrupted at this time point $T_1$ when the stagnation has been detected, a detection signal is input to the number of times of stagnation determination flag 42, and the same determination flag 42 sets the value of F ($T_1$) according to the process represented by the following Equation-(9):

$$F(T_1) = F(T_0) + 1 \quad (9)$$

The value F ($T_1$) of the above-mentioned number of times of stagnation determination flag 42 is input to the control device 43, and after the control device 43 performed driving of the push-in device 44 for a period of $\Delta T$ in order to eliminate the stagnation, it outputs a finish signal to the above-mentioned stagnation detector system 41, and from the time point $T_1 + \Delta T$ again the stagnation detector system 41 commences detection of stagnation.

At the time point $T_2$ when a first result of detection has appeared after the stagnation detector system 41 recommenced detection of stagnation, the number of times of stagnation detection flag 42 sets the value of F ($T_2$) in the following manner:

In the case where stagnation has not been detected, $F(T_2) = 0$ is set; but

In the case where stagnation has been detected, according to the process of Equation (9),
$F(T_2) = F(T_0) + 1$ is set.

In other words, in the case where stagnation has been detected at the time point $T_2$, F ($T_2$)=2 is set, and after the time point $T_2$, control is carried out in the following manner according to the value F (T) of the number of times of stagnation determination flag 42:

If F (T) = 0, detection of stagnation is continued; but
If 0 < F (T) < n, after the control device 43 was operated so as to eliminate stagnation, detection of stagnation is recommenced.

In the case where stagnation was detected consecutively more than a predetermined number of times, since a counter-measure such as stoppage of the feeder section is necessary;

If n ≤ F (T), the control device 43 issues an alarm to an operator of the refuse shredder.

In the above-described preferred embodiment, it is possible to carry out determination of stagnation successively in the above-described manner, to appropriately actuate the push-in device 44 at the time point when stagnation has been detected, and to judge the effect of the operation.

Figure 9:
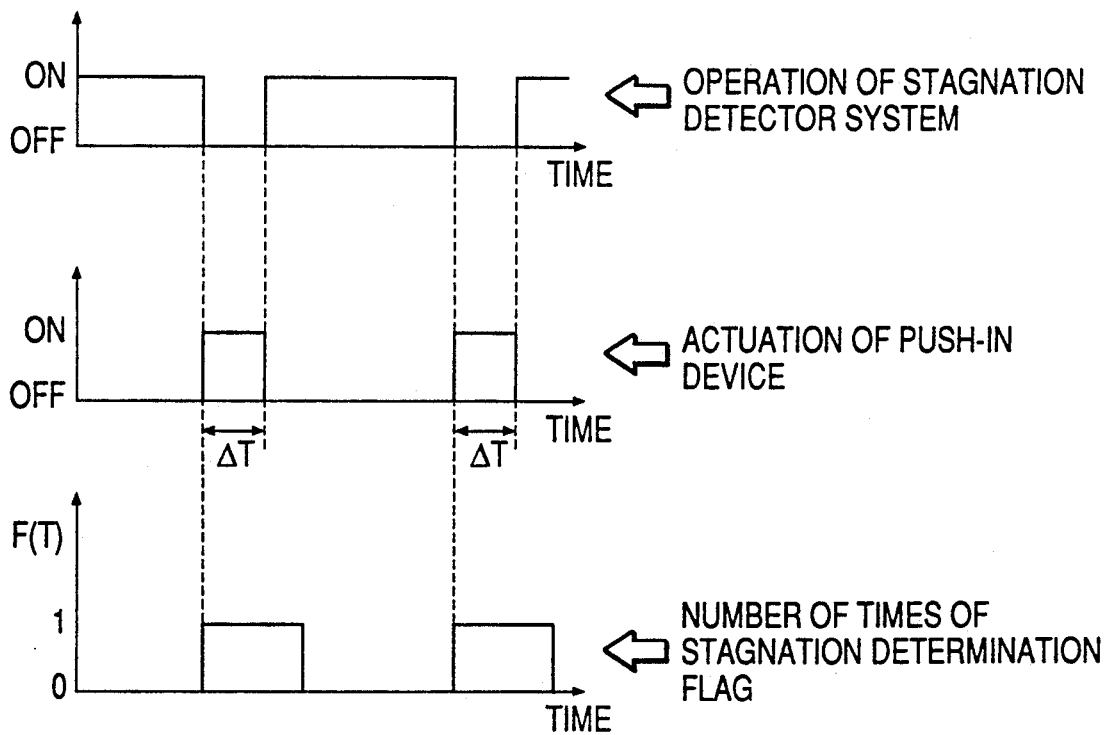
FIG. 9 is a diagram for explaining operations of the third preferred embodiment of the present invention.
Figure 10:
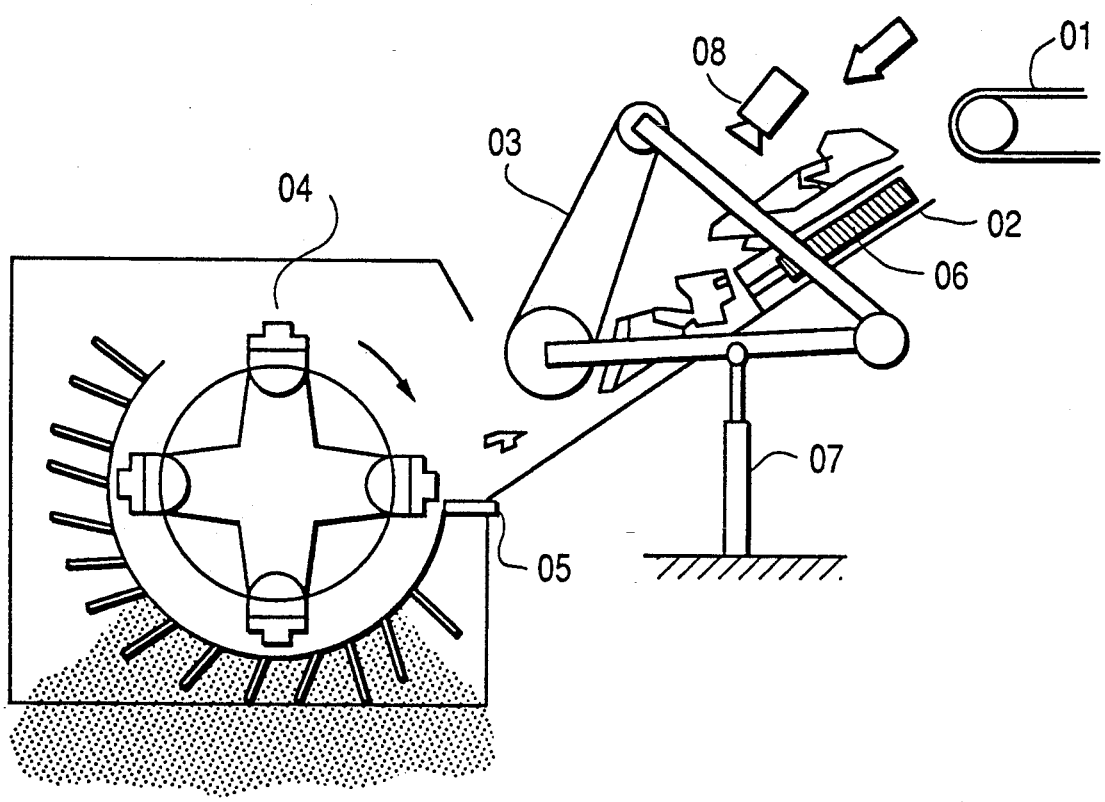
FIG. 10 is a schematic diagram for explaining a construction of a refuse shredder in the prior art.

FIG. 9 is a diagram showing the effects of this invention, in which an operating state of the stagnation detector system 41 and the push-in device 44 and variation with time of the value F (T) of the stagnation determination flag 42 are graphically shown along the same time axis.

As shown in FIG. 9, if the stagnation determination flag 42 is F (T)=1, the push-in device 44 operates, and after it operated for a predetermined period $\Delta T$, detection of stagnation is recommenced.

Thereafter, in the case where the push-in device 44 operated effectively and stagnation has been eliminated, the flag 42 returns to F (T)=0, and detection of stagnation is continued.

Through the above-mentioned operations, detection of stagnation in a refuse shredder and operation of a refuse shredder in response to stagnation are automated, and so, mitigation of an operating burden of an operator becomes possible.

As will be apparent from the detailed description of the preferred embodiments above, if the detector system for whether existence or non-existence of refuse according to the present invention is used, owing to the fact that automatic detection of whether existence or non-existence of refuse becomes possible, an operating burden of an operator can be mitigated, and also application of the detector system to automation of level control of refuse within a feeder becomes possible.

If the detector system for stagnation of refuse according to the present invention is used, owing to the fact that automatic determination of whether or not refuse has been charged is made possible by calculating an area occupied by refuse from a picked up image of a feeder section and determining by means of a determination device, and automation of determination of whether or not refuse is stagnating is made possible by adding the above-mentioned image to calculate an area occupied by refuse starting from the time point when refuse has been charged and determining by means of a determination device, an operating burden of an operator is mitigated, and also application of the detector system to automation of level control of refuse within a feeder becomes possible.

If the system for preventing stagnation of refuse according to the present invention is used, owing to the fact that a stagnation detection system detects stagnation of refuse, a number of times of stagnation determination flag stores a number of times of consecutive detection of stagnation of refuse, and a control device having the number of times signal input thereto actuates a push-in device and an alarm device, it becomes possible to automatic detection of stagnation in a refuse shredder as well as operation of a push-in device in response to the stagnation, and to mitigate an operating burden of an operator.

While a principle of the present invention has been described above in connection to preferred embodiments of the invention, it is intended that all matter contained in the above description and illustrated in the accompanying drawings shall be interpreted to be illustrative and not in a limiting sense.

What is claimed is:

1. A detector system for detecting whether refuse exists in a section of a refuse processing apparatus, said system comprising: an image pick-up device which picks up an image of said section of the refuse processing apparatus and outputs the image as a video signal, an A/D converter which digitizes the video signal output from said image pick-up device, a background image memory which stores a plurality of images of said section of the refuse processing apparatus, a luminance variation detector which responds to outputs of said A/D converter and said background image memory to detect variations in the luminance of the image picked up by said image pick-up device, a background image selector which responds to outputs of said luminance variation detector and said background image memory to output one of said plurality of images depending upon the variations in the luminance, a subtractor receiving outputs of said A/D converter and said background image selector and outputting a difference between said outputs, a binary-encoder which responds to an output of said subtractor and binary-encodes the output of said subtractor, an area calculator which responds to the output of said binary encoder to calculate an area within the section of said refuse processing apparatus having predetermined characteristics pertaining to the existence of refuse, and a determinator responsive to an output of said area calculator to determine whether refuse exits in said section of the refuse processing apparatus.

2. A detector system for detecting whether refuse is stagnating in a feeding section of a refuse processing apparatus, said system comprising: an image pick-up device which converts an external image into a video signal, and A/D converter which converts the signal output from said image pick-up device into digital images, an adder-memory which adds together the outputs of said A/D converter, representing said digital images, starting from when refuse has been charged into the feeder section and which adder-memory stores the added result as digital data, an averaging device which receives the digital data stored in said adder-memory and perform an averaging process on said digital data to yield data representative of an average one of said digital images, first and second background image memories in which background images are stored, first and second subtractors which subtract digital data representative of said background images stored in the background image memories from the digital data output by said A/D converter and by said averaging device, respectively, first and second binary-encoders which binary-code the outputs of said first and second subtractors, respectively, on the basis of respective thresholds to yield binary images, first and second area calculators which respectively calculate the areas of the binary images output from said first and second binary-encoders, a determination flag which becomes set to a value based on a last determined state of refuse in the feeder section, a first determinator which determines whether refuse has been charged into the feeder section on the basis of the area calculated by said first area calculator, a value of said determination flag and a threshold, and a second determinator for determining whether refuse is stagnating in the feeder section on the basis of the area calculated by said second area calculator and a threshold.

3. A system for preventing refuse from stagnating in a feeder section of a refuse processing apparatus, said system comprising: a stagnation detector which automatically detects for a state of stagnation of refuse in the feeder section and outputs a signal each time said state is detected, a stagnation determination flag to which detection signals are input from said stagnation detector and which flag stores the number of times consecutive ones of said detection signals are indicative of the detection of said state of stagnation of refuse by said stagnation detector, a push-in device actuatable to push refuse in the feeder section to alleviate stagnation of the refuse thereat, an alarm and a control device operatively connected to said determination flag, said push-in device, said alarm, and said stagnation detector, said control device receiving output of said determination flag and controlling said push-in device and said alarm on the basis of said output of the determination flag, and said control device interrupting the operation of said stagnation detector once a state of stagnation of the refuse is detected and controlling said stagnation detector to recommence its operation upon the lapse of a predetermined time.

* * * * *